US012704098B2

(12) United States Patent
Leone et al.

(10) Patent No.: US 12,704,098 B2
(45) Date of Patent: Aug. 11, 2026

(54) SYSTEM AND METHOD FOR OPERATING AN ENGINE

(71) Applicant: Ford Global Technologies, LLC, Dearborn, MI (US)

(72) Inventors: Thomas Leone, Ypsilanti, MI (US); Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

(21) Appl. No.: 18/295,218

(22) Filed: Apr. 3, 2023

(65) Prior Publication Data

US 2024/0328369 A1 Oct. 3, 2024

(51) Int. Cl.
*F02D 41/06* (2006.01)
*F02D 41/00* (2006.01)

(52) U.S. Cl.
CPC ....... *F02D 41/064* (2013.01); *F02D 41/0087* (2013.01); *F02D 2200/021* (2013.01); *F02D 2200/0802* (2013.01); *F02D 2200/1015* (2013.01)

(58) Field of Classification Search
CPC ............... F02D 41/064; F02D 41/0087; F02D 2200/1015; F02D 2200/0802; F02D 2200/021
See application file for complete search history.

(56) References Cited

U.S. PATENT DOCUMENTS

| | | | | |
|---|---|---|---|---|
| 6,405,705 | B1 * | 6/2002 | Dunsworth | F02D 41/0087 123/481 |
| 8,215,284 | B2 | 7/2012 | Suzuki et al. | |
| 9,689,327 | B2 * | 6/2017 | Younkins | F02D 41/1401 |
| 10,724,423 | B2 | 7/2020 | Loetz | |
| 10,801,383 | B1 * | 10/2020 | Rackmil | F01N 13/10 |
| 11,066,980 | B1 | 7/2021 | Leone et al. | |
| 11,156,481 | B2 | 10/2021 | Naor | |
| 11,215,109 | B2 | 1/2022 | Ono et al. | |
| 11,280,278 | B2 | 3/2022 | Leone et al. | |
| 11,293,337 | B1 | 4/2022 | Czekala et al. | |
| 11,365,685 | B2 | 6/2022 | Leone et al. | |
| 11,378,002 | B1 | 7/2022 | Leone et al. | |
| 11,512,624 | B1 | 11/2022 | Leone et al. | |
| 2006/0219210 | A1 | 10/2006 | Bailey et al. | |

(Continued)

FOREIGN PATENT DOCUMENTS

| | | | | |
|---|---|---|---|---|
| CN | 106460687 | * | 2/2017 | |
| DE | 102015212244 A1 | * | 1/2017 | F02B 1/12 |

(Continued)

OTHER PUBLICATIONS

"Pre-Chamber Ignition: Key Technologies for Highly Efficient SI Engines", https://youtu.be/PCDDXtFmtVs, IAVchannel, Oct. 4, 2018 (Year: 2018).*

*Primary Examiner* — Kevin A Lathers
(74) *Attorney, Agent, or Firm* — McCoy Russell LLP

(57) ABSTRACT

System and methods for an internal combustion engine are described. In one example, the internal combustion engine includes one or more engine cylinders having igniters that include a pre-chamber. One or more of the engine cylinders may be operated in a skip-fire mode if a cylinder misfires or if the internal combustion engine is cold started.

18 Claims, 5 Drawing Sheets

(56) References Cited

U.S. PATENT DOCUMENTS

| | | | | |
|---|---|---|---|---|
| 2015/0369141 | A1* | 12/2015 | Soliman | F02D 17/02 123/406.2 |
| 2016/0003117 | A1 | 1/2016 | Cook | |
| 2016/0109330 | A1* | 4/2016 | Chen | G01M 15/11 73/114.06 |
| 2016/0215682 | A1 | 7/2016 | Hiltner et al. | |
| 2016/0222899 | A1* | 8/2016 | Glugla | F02D 41/064 |
| 2017/0130630 | A1* | 5/2017 | Younkins | F01N 13/009 |
| 2018/0003136 | A1 | 1/2018 | Coldren et al. | |
| 2018/0230894 | A1 | 8/2018 | Loetz | |
| 2021/0010414 | A1 | 1/2021 | Julien et al. | |
| 2021/0156325 | A1 | 5/2021 | Glugla | |
| 2021/0246822 | A1 | 8/2021 | Ono et al. | |

FOREIGN PATENT DOCUMENTS

| | | | | | |
|---|---|---|---|---|---|
| DE | 102019101435 | A1 | | 9/2019 | |
| DE | 102020111684 | | * | 11/2021 | |
| GB | 2546307 | | * | 7/2017 | |
| JP | 2021127706 | A | | 9/2021 | |
| WO | WO-2015196060 | A1 | * | 12/2015 | B60K 6/24 |
| WO | 2016057557 | A1 | | 4/2016 | |

* cited by examiner

SYSTEM AND METHOD FOR OPERATING AN ENGINE

FIELD

The present description relates to operating an internal combustion engine that includes an ignition source with a pre-chamber. The internal combustion engine may be operated in a skip-fire mode.

BACKGROUND AND SUMMARY

An igniter that includes a spark source and a pre-chamber may be provided with an internal combustion engine to increase an engine's tolerance for high percentages of exhaust gas recirculation (EGR) in a cylinder mixture. An igniter that has a fixed-geometry pre-chamber may help to improve combustion, but fixed-geometry pre-chambers may not help to provide robust combustion during all engine operating conditions. For example, some fixed-geometry pre-chambers may be suitable for combustion at higher engine loads while other fixed-geometry pre-chambers may be suitable for combustion at lower engine loads. It may be desirable to maximize the effective operating range of particular fixed-geometry pre-chamber so that improved combustion may be provided over a wider range of engine operating conditions.

The inventors herein have recognized the above-mentioned issues and have developed an engine system, comprising: an internal combustion engine; a cylinder including a first igniter having a pre-chamber; and a controller including executable instructions stored in non-transitory memory that cause the controller to operate the cylinder of the internal combustion engine in skip-fire mode in response to a cold start of the internal combustion engine.

By operating a cylinder of an engine that includes an igniter and pre-chamber in a skip-fire mode in response to cold starting the engine, it may be possible to extend engine operating conditions where an igniter with pre-chamber operates robustly. In particular, operating the cylinder in skip-fire mode may allow residual exhaust gases to be cleared from the pre-chamber so that the igniter ignites an air-fuel mixture as expected during a cylinder cycle that immediately follows a cylinder cycle in which the cylinder was deactivated.

The present description may provide several advantages. In particular, the approach may allow an engine to combust air-fuel mixtures more robustly. Further, the approach may be extended to improve combustion after a misfire. Additionally, the approach may be applied to reduce engine emissions.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
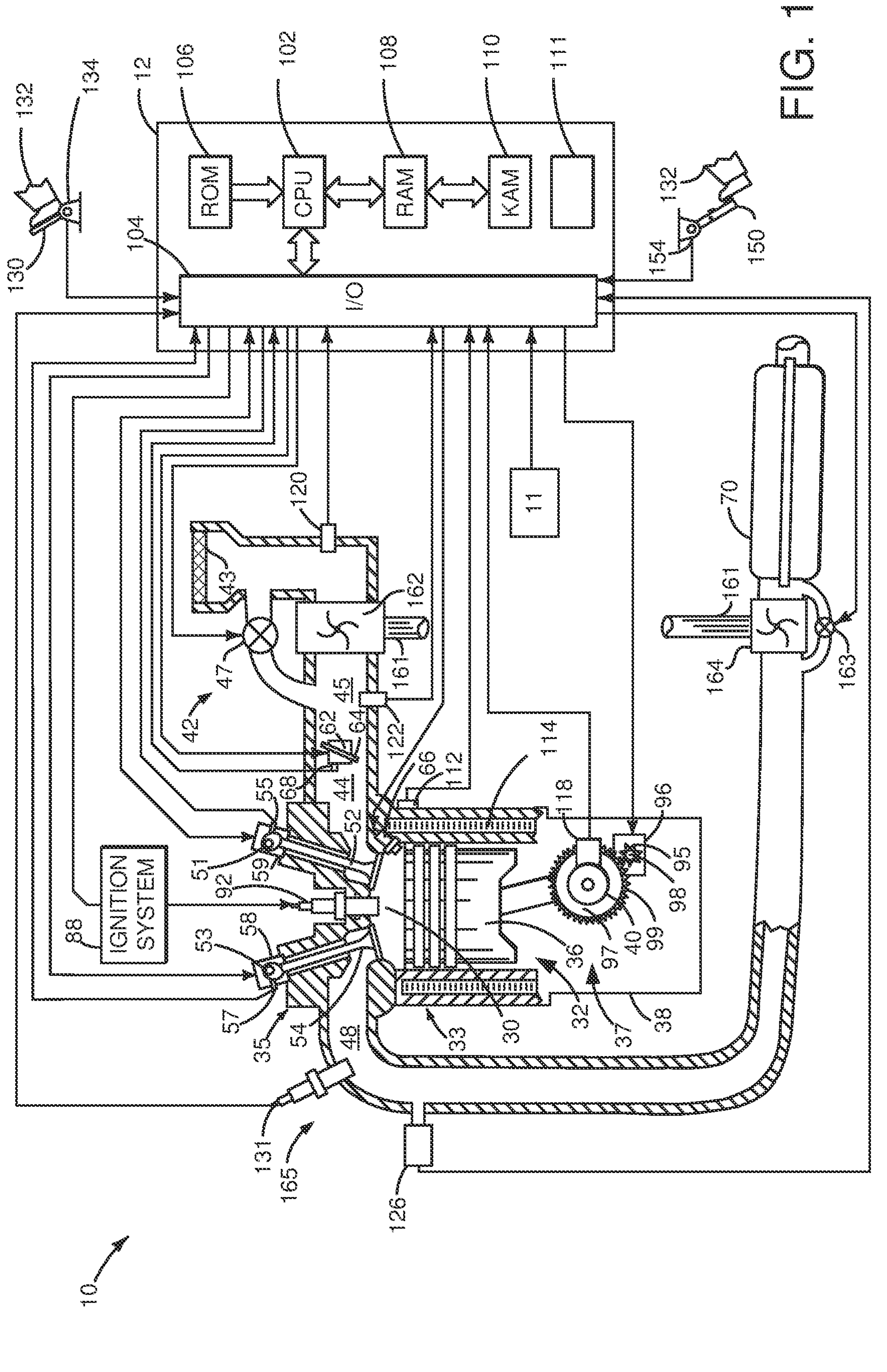
FIG. 1 is a schematic diagram of an engine.
Figure 2:
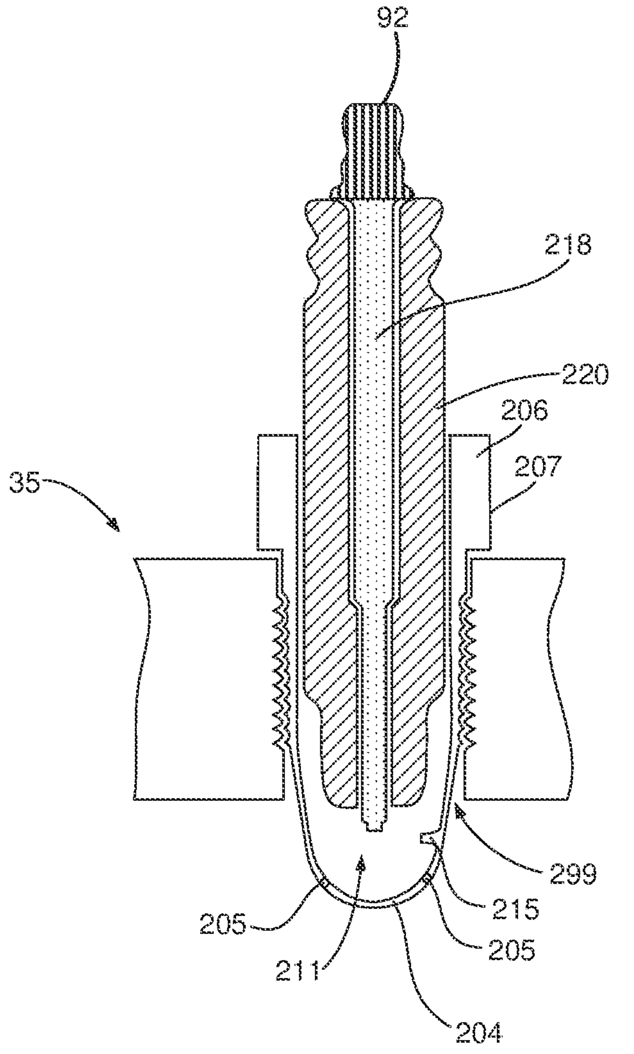
FIG. 2 is an example igniter that may be included with the engine of FIG. 1.

The present description is related to an internal combustion engine that includes an igniter with pre-chamber. The igniter may be installed into a cylinder via a cylinder head as shown in FIG. 1. The igniter may be configured as shown in FIG. 2. The engine may be operated according to the sequences shown in FIGS. 3 and 4. The engine may be operated according to the method of FIG. 5.

Referring to FIG. 1, internal combustion engine 10, comprising a plurality of cylinders, one cylinder of which is shown in FIG. 1, is controlled by electronic engine controller 12. Controller 12 receives signals from the various sensors shown in FIG. 1. Further, controller 12 employs the actuators shown in FIG. 1 to adjust engine operation based on the received signals and instructions stored in non-transitory memory of controller 12.

Engine 10 is comprised of cylinder head 35 and block 33, which include combustion chamber 30 and cylinder 32. Piston 36 is positioned therein and reciprocates via a connection to crankshaft 40. Flywheel 97 and ring gear 99 are coupled to crankshaft 40. Engine 10 includes an oil pan 38 that is coupled to block 33. Block 33 and oil pan 38 form an engine crankcase 37 that holds oil and blow-by gases. Blow-by gases may be returned to engine air intake 42 via a positive crankcase ventilation system (not shown).

Starter 96 (e.g., an optional low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into combustion chamber 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via igniter 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126. Exhaust system 165 includes exhaust manifold 48, catalytic converter 70, and oxygen sensor 126. Engine 10 may include a second igniter 131 that is positioned in exhaust system 165, in exhaust manifold 48 for example. Second igniter 131 may be a spark plug or glow plug that is activated to combust fuel that enters the exhaust system to rapidly heat catalytic converter 70.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 may also include one or more timers and/or counters 111 that keep track of an amount of time between a first event and a second event. The timer and/or counters may be constructed in hardware or software. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as igniter 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

The systems of FIG. 1 provides for an engine system, comprising: an internal combustion engine; a cylinder including a first igniter having a pre-chamber; and a controller including executable instructions stored in non-transitory memory that cause the controller to operate the cylinder of the internal combustion engine in skip-fire mode in response to a cold start of the internal combustion engine. In a first example, the engine system includes where the skip-fire mode includes not combusting fuel in the cylinder during every other cycle of the cylinder. In a second example that may include the first example, the engine system further comprises a second igniter coupled to an exhaust manifold. In a third example that may include one or both of the first and second examples, the engine system includes where the cold start comprises a temperature of the internal combustion engine being less than a threshold temperature. In a fourth example that may include one or more of the first through third examples, the engine system further comprises additional executable instructions that cause the controller to operate a second cylinder of the internal combustion engine in skip-fire mode. In a fifth example that may include one or more of the first through fourth examples, the engine system includes where the cylinder is operated in skip-fire mode during a different engine cycle than an engine cycle when the second cylinder is operated in skip-fire mode. In a sixth example that may include one or more of the first through fifth examples, the engine system further comprises additional executable instructions that cause the controller to change from skip-fire mode to fire each cycle mode in response to a catalyst temperature. In a seventh example that may include one or more of the first through sixth examples, the engine system further comprises additional executable instructions that cause the controller to enter skip-fire mode a predetermined actual total number of engine cycles after exiting engine cranking.

The system of FIG. 1 also provides for an engine system, comprising: an internal combustion engine; a cylinder including a first igniter having a pre-chamber; and a controller including executable instructions stored in non-transitory memory that cause the controller to operate the cylinder of the internal combustion engine in skip-fire mode in response to a misfire in the cylinder. In a first example, the engine system includes where the cylinder is operated in skip-fire mode for a single engine cycle immediately following the misfire. In a second example that may include the first example, the engine system further comprises additional executable instructions that cause the controller to not inject fuel to the cylinder while operating the cylinder in the skip-fire mode. In a third example that may include one or both of the first and second examples, the engine system further comprises additional executable instructions that cause the controller to exit skip-fire mode after the engine rotates through one engine cycle. In a fourth example that may include one or more of the first through third examples, the engine system further comprises additional executable instructions that cause the controller to recognize the misfire.

Referring now to FIG. 2, a schematic of an example igniter 92 is shown. Igniter 92 may be the same igniter that is shown in FIG. 1. Igniter 92 is shown in cross section.

Igniter 92 includes a body 206, a center electrode 218, and an insulator 220. The body 206 may be of metallic construction and the insulator 220 may be of ceramic construction. The center electrode 218 may be comprised of one or more materials including but not limited to copper.

Body 206 includes a hex 207, a ground electrode 215, and a shield or cover 204. Shield or cover 204 provides a portion of a boundary for pre-chamber 211. Shield or cover 204 at least partially encloses pre-chamber 211. Shield or cover 204 includes orifices 205, which allow gases (e.g., air and fuel vapor) from cylinder 32 to enter and exit pre-chamber 211. Insulator 220 and center electrode 218 may be press fit into body 206.

Cylinder head 35 includes a through hole 299 into which igniter 92 may be inserted as shown in FIG. 2. Dashed line 260 represents a plane that separates igniter 92 into two regions or sides. In particular, a second region or side 262 is longitudinally above dashed line 260, and dashed line 260 marks where center electrode 218 begins to protrude from insulator 220 into the pre-chamber 211. A first region or side 261 is longitudinally below dashed line 260. Orifices 205 are shown on the first side 262 of igniter 92 and one or more exhaust orifices 210 and 212 are shown on the second side 261 of igniter 92.

Figure 3:
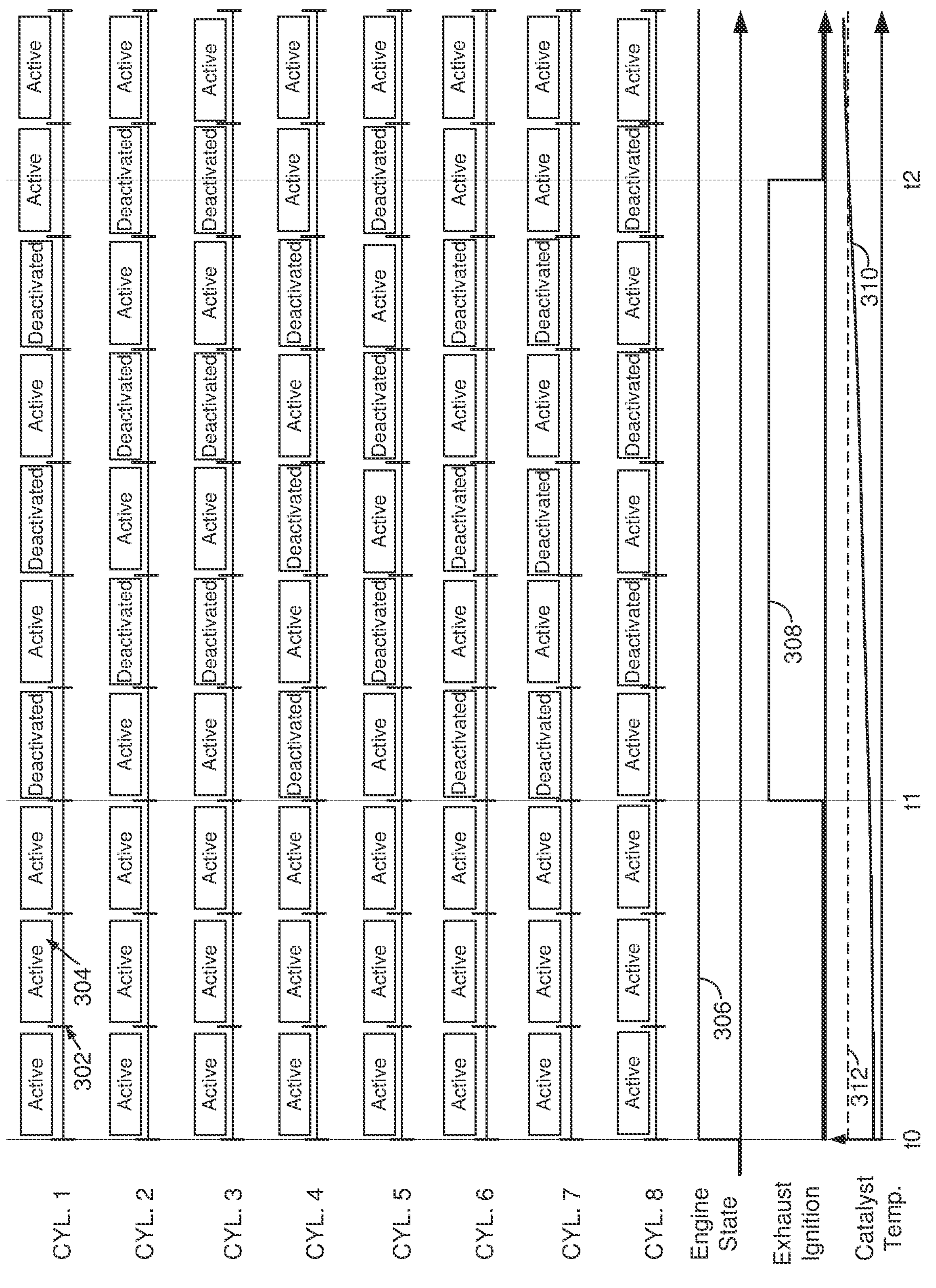
FIGS. 3 and 4 are example engine operating sequences according to the method of FIG. 4.

Referring now to FIG. 3, an engine starting sequence for a cold engine start is shown. The cold start sequence may be generated via the system of FIG. 1 in cooperation with the method of FIG. 5. Times of interest are indicated at the vertical lines t0-t2.

The first plot from the top of FIG. 3 is a plot of cylinder number one operating state versus engine cycle. The engine cycles are separated by vertical bars as shown at 302. The distance between two adjacent vertical bars represents one engine cycle (e.g., two engine revolutions for a four stroke engine). A cylinder is combusting air and fuel during a cycle of the cylinder when a box is labeled "Active." A cylinder is not combusting air and fuel during a cycle of the cylinder when the cylinder is labeled "Deactivated." The cylinder's intake and exhaust valves continue to operate so that air is drawn into and expelled from a cylinder when the cylinder is deactivated. The "Activated" and "Deactivated" indications apply to all engine cylinders. The second through eighth plots represent operating states of cylinders 2-8.

The ninth plot from the top of FIG. 3 is a plot of engine operating state versus engine cycle. Trace 306 represents engine operating state and the engine is not operating or rotating when trace 306 is at a lower level near the horizontal axis. The engine is rotating and operating when trace 306 is at a higher level above the horizontal axis.

The tenth plot from the top of FIG. 3 is a plot of engine exhaust ignition state versus engine cycle. Trace 308 represents the engine exhaust ignition state and the engine exhaust ignition is not activated when trace 308 is at a lower level near the horizontal axis. The engine exhaust ignition is activated when trace 308 is at a higher level above the horizontal axis.

The eleventh plot from the top of FIG. 3 is a plot of catalyst temperature versus engine cycle. Trace 310 represents catalyst temperature and catalyst temperature increases in the direction of the vertical axis arrow. Horizontal line 312 represents a catalyst light-off temperature (e.g., a temperature at which the catalyst conversion efficiency is greater than a threshold efficiency).

At time t0, the engine begins to be cranked during an engine cold start. All cylinders are activated and combustion begins in the cylinders at times to the right of time t0. Combustion is initiated in each engine cylinder via an igniter that includes a pre-chamber. The exhaust ignition system is not activated because combustion is initiated in all engine cylinders. The catalyst temperature is below the catalyst light-off temperature.

At time t1, a predetermined number of engine cycles have passed since the most recent time engine starting began (e.g., time t0). In this example, four engine cycles have elapsed since time t0. The engine switches cylinders into skip-fire mode. In this example, four cylinders of an eight cylinder engine are deactivated while four cylinders remain activated to operate the engine cylinders in skip-fire mode. However, the number of active and deactivated cylinders may be different depending on the total number of engine cylinders. In skip-fire mode, a cylinder changes from combusting air and fuel in a first cylinder cycle to not combusting air and fuel in a second cylinder cycle that immediately follows the first cylinder cycle before combusting air and fuel in a third cylinder cycle that immediately follows the second cylinder cycle. The intake and exhaust valves of the deactivated cylinders continue to operate so air is drawn into and expelled from deactivated cylinders. By deactivating four cylinders during an engine cycle, exhaust gas residuals in pre-chambers of igniters in deactivated cylinders may be replaced with fresh air. The fresh air in the pre-chamber may improve ignition of an air-fuel mixture via the igniter. Additionally, fuel may be injected to the deactivated cylinder late during a cycle of the cylinder that is receiving the fuel. For example, fuel may be injected during an exhaust stroke of the deactivated cylinder so that fuel and air or an air-fuel mixture may be ejected from the deactivated cylinder into the exhaust system. The fuel and air that is ejected from the deactivated cylinder may be combusted via supplying a spark via a second igniter that is in the exhaust system. Combusting air and fuel in the exhaust system may increase catalyst temperature and reduce catalyst warm-up time, thereby reducing engine emissions.

The first four cylinders to be deactivated after time t1 are cylinder one, cylinder four, cylinder six, and cylinder seven. Deactivating these cylinders allows the engine to operate smoothly as a four cylinder engine. Cylinders two, three, five, and eight remain activated to allow engine speed to be maintained at idle speed.

During a second engine cycle after time t1, cylinders two, three, five, and eight are deactivated and cylinders one, four, six, and seven are activated. Cylinders two, three, five, and eight are deactivated so that residual gases in pre-chambers of igniters may be replaced with air so that the igniters are able to initiate combustion in a subsequent engine cycle. In this way, cylinders that are deactivated may be changed from engine cycle to engine cycle to improve a possibility of combustion via the igniters.

At time t2, the catalyst temperature is greater than the catalyst light-off temperature. Therefore, all engine cylinders switch out of skip-fire mode and are activated. In this way, operating the engine's cylinders in skip-fire mode may reduce an amount of time that it takes for a catalyst downstream of an engine to reach light-off temperature.

Figure 4:
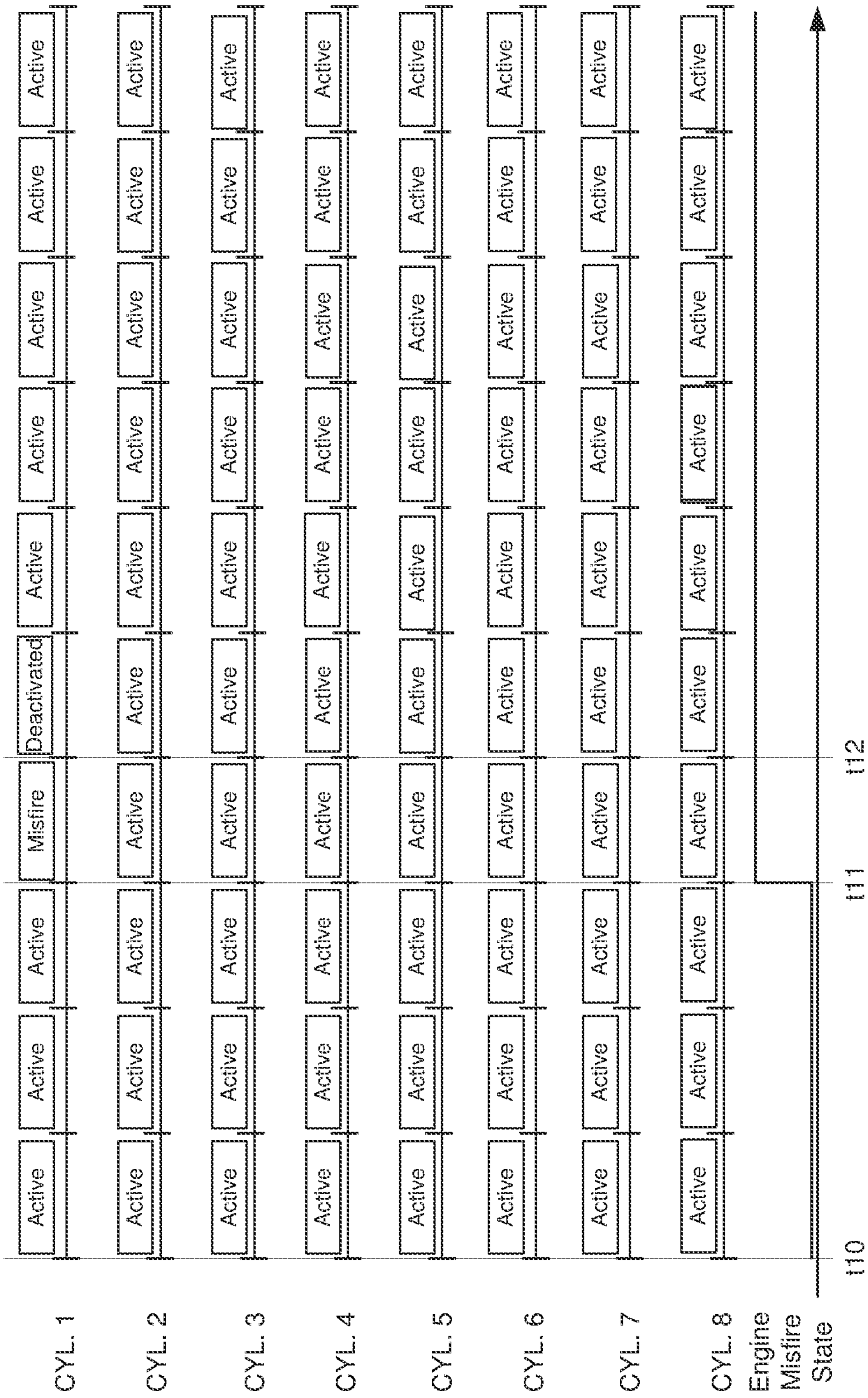

Referring now to FIG. 4, an engine countermeasure for cylinder misfires is shown. The sequence of FIG. 4 may be generated via the system of FIG. 1 in cooperation with the method of FIG. 5. Times of interest are indicated at the vertical lines t10-t12.

The first plot from the top of FIG. 4 is a plot of cylinder number one operating state versus engine cycle. The engine cycles are separated by vertical bars as shown at 402. The distance between two adjacent vertical bars represents one engine cycle (e.g., two engine revolutions for a four stroke engine). A cylinder is combusting air and fuel during a cycle of the cylinder when a box is labeled "Active." A cylinder is not combusting air and fuel during a cycle of the cylinder when the cylinder is labeled "Deactivated." The cylinder's intake and exhaust valves continue to operate so that air is drawn into and expelled from a cylinder when the cylinder is deactivated. The "Activated" and "Deactivated" indications apply to all engine cylinders. The second through eighth plots represent operating states of cylinders 2-8.

The ninth plot from the top of FIG. 4 is a plot of engine misfire state versus engine cycle. Trace 406 represents engine misfire state and the engine is not misfiring when trace 406 is at a lower level near the horizontal axis. The engine is misfiring when trace 406 is at a higher level above the horizontal axis.

At time t10, the engine is not misfiring and all engine cylinders are activated. All cylinders are using igniters to initiate combustion of air-fuel mixtures in the cylinders.

At time t11, an engine cycle in which cylinder number one misfires begins. The cylinder misfire may be detected via a reduction in engine speed, flame ionization detection, or other means.

At time t12, an engine cylinder in which cylinder number one is deactivated begins. Cylinder number one may be deactivated by not inducing a spark or flame in cylinder number one during the engine cycle. Fuel is not injected into cylinder one in a cycle of cylinder number one immediately following the misfire in cylinder number one. By deactivating cylinder number one, residual exhaust gases may be driven from the pre-chamber of an igniter of cylinder number one. Driving residual exhaust gases from the pre-chamber of an igniter in cylinder number one may improve a flame front that may be generated via the igniter. Once one skip-fire cycle is complete to remove residual exhaust gases from the pre-chamber of the igniter in cylinder number one, cylinder number one is reactivated.

Figure 5:
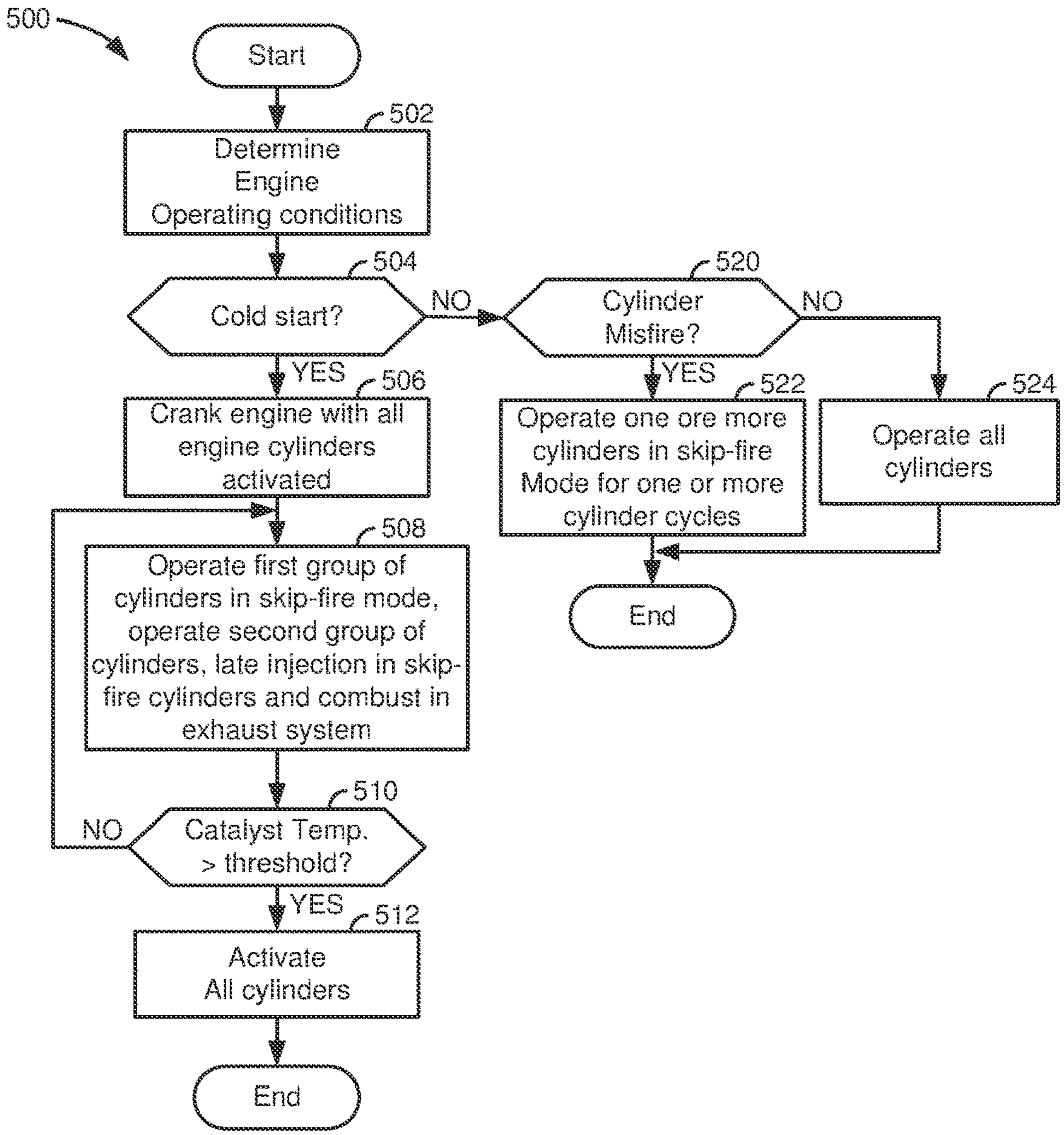
FIG. 5 is a method for operating an engine that includes an igniter with pre-chamber.

Referring now to FIG. 5, a flow chart of a method for operating an engine that includes an igniter as shown in either of FIG. 2 is shown. The method of FIG. 5 may be applied to the system of FIG. 1. The method of FIG. 5 may be performed via a controller. The controller may receive inputs from sensors and adjust actuators to change operating states of devices in the physical world.

At 502, method 500 determines engine operating conditions. Engine operating conditions may include, but are not limited to engine speed, engine load, driver demand, ambient air temperature, ambient air pressure, vehicle speed, engine misfire, engine temperature, catalyst temperature, etc. Method 500 proceeds to 504.

At 504, method 500 judges whether or not the engine is being cold started. In one example, method 500 judges that the engine is being cold started if an engine start request is present (e.g., key or pushbutton input), engine temperature is less than a threshold, and catalyst temperature is less than a threshold. If method 500 judges that the engine is being cold started, the answer is yes and method 500 proceeds to 506. Otherwise, the answer is no and method 500 proceeds to 520.

At 520, method 500 judges whether or not the engine is misfiring. Method 500 may judge that the engine is misfiring if engine speed drops, cylinder pressure indicates misfire, or misfire is detected via an ionization probe. If method 500 judges that misfire is present, the answer is yes and method 500 proceeds to 522. Otherwise, the answer is no and method 500 proceeds to 524.

At 524, method 500 operates all engine cylinders. Method 500 operates all engine cylinders via opening and closing intake and exhaust valves in a cycle of the engine. Further, operating the engine cylinders includes injecting fuel into engine cylinders and providing ignition spark or flame in engine cylinders. Engine flames and/or spark may be generated via an igniter as shown in FIG. 2. Method 500 proceeds to exit.

At 522, method 500 operates one or more cylinders in a skip-fire mode in a cycle of the engine that follows the cylinder cycle in which the cylinder misfired. In one example, method 500 operates a cylinder that has most recently misfired in a skip-fire mode in a cycle of the cylinder that immediately follows the cylinder cycle in which the cylinder misfired. For example, if cylinder number one of an engine misfires 2000 cycles after the engine that includes cylinder number one has started, then cylinder number one is operated in skip-fire mode in its 2001 cycle after the engine is started. Operating the misfiring cylinder in skip-fire mode includes inducting air into the cylinder, not providing fuel to the misfired cylinder, pushing the air through the cylinder and into the engine exhaust. Once air is pushed through the misfiring cylinder, the misfiring cylinder is reactivated by inducting air into the cylinder, adding fuel to the cylinder to generate an air-fuel mixture, combusting the air-fuel mixture, and ejecting the products of combustion from the cylinder. Thus, intake and exhaust valves of the misfiring cylinder continue to operate and exhaust gases are purged from a pre-chamber of an igniter in the misfiring cylinder. The misfiring cylinder is reactivated one cylinder cycle of the misfiring cylinder after the misfiring cylinder is deactivated.

In another example, one or more engine cylinders may enter skip-fire mode in response to one or more cylinders misfiring one or more times. For example, if cylinder number two misfires a predetermined number of times, cylinder number two may operate in skip-fire mode for a predetermined number of engine cycles, whereby cylinder number one skip-fires, operates, and skip-fires over the predetermined number of engine cycles. Alternatively, if cylinder number two misfires a predetermined number of times, more than one engine cylinder may be operated in skip-fire mode for a predetermined number of engine cycles so that exhaust gas residuals may be evacuated from pre-chambers of more than one engine cylinder to preemptively reduce a possibility of misfires in engine cylinders. In another example, if cylinder numbers two and four misfire, one or more engine cylinders may enter skip-fire mode for one or more engine cycles to clear residuals from pre-chambers of ignitors. Method 500 proceeds to exit.

At, 506, method 500 cranks the engine with all engine cylinders activated. Method 500 may crank (e.g., rotate the engine crankshaft under power of an electric machine) with all engine cylinders activated. For example, if the engine is an eight cylinder engine, method 500 may begin combusting air and fuel in all eight engine cylinders according to engine position and engine firing order. Method 500 proceeds to 508.

At 508, method 500 operates a first group of engine cylinders in skip-fire mode. Operating the first group of cylinders in skip-fire mode includes deactivating cylinders in the first group of cylinders such that fuel is not combusted in cylinders of the first group of cylinders during a first cycle of an engine followed by activating cylinders in the first group of cylinders during a second cycle of the engine that immediately follows the first cycle of the engine.

Method 500 also operates a second group of engine cylinders in skip-fire mode, but cylinders in the second group of cylinders are operated out of phase with cylinders in the first group of engine cylinders. For example, when cylinders in the first group of cylinders are activated during a first engine cycle, cylinders in the second group of cylinders are deactivated during the first engine cycle. Likewise, when cylinders in the first group of cylinders are deactivated in a second engine cycle, cylinders in the second group of cylinders are activated during the second engine cycle. Thus, the cylinders that are in the first group of cylinders operate in skip-fire mode out of phase with cylinders that are in the second group of cylinders as shown in FIG. 3.

When a cylinder is deactivated, intake and exhaust valves operate such that fresh air is inducted to the deactivated cylinder during an engine cycle. The fresh air may purge exhaust gas residuals from the pre-chamber of an igniter so that combustion may be better supported in the cylinder via the igniter. Further, a deactivated cylinder may receive fuel during an exhaust stroke or late in an expansion stroke of the deactivated cylinder that is receiving the fuel. The fuel is not combusted in the deactivated cylinder. Rather, one or more igniters or glow plugs may initiate combustion of fuel that is exhausted from the deactivated cylinder. The exhausted fuel is combusted in the engine's exhaust system so as to rapidly heat the catalyst, thereby reducing catalyst light-off time and engine emissions. Air that is pumped through a deactivated cylinder is combined with fuel that may be injected late into the cylinder to heat exhaust system components.

An active cylinder combusts an air-fuel mixture and exhausts byproducts of combustion to the engine exhaust system. Combustion in the active cylinders may be initiated by a spark or flame that is generated via an igniter that includes a pre-chamber. In one example, where the engine is an eight cylinder engine, four cylinders are included in the first group of engine cylinders and four cylinders are included in the second group of engine cylinders. Method 500 proceeds to 510.

At 510, method 500 judges whether or not a temperature of a catalyst is greater than a threshold temperature (e.g., a catalyst light-off temperature). If so, the answer is yes and method 500 proceeds to 512. Otherwise, the answer is no and method 500 returns to 508.

At 512, method 500 activates all engine cylinders in the first and second groups of cylinders. Thus, all of the engine's cylinders may combust air and fuel each engine cycle. Method 500 proceeds to exit.

In this way, engine cylinders that include igniters with pre-chambers may be operated to forcibly purge pre-chambers of combustion byproducts so that combustion of subsequent air fuel mixtures may be robust. Further, if a cylinder experiences a misfire, exhaust gas residuals in the pre-chamber of the misfiring cylinders may be purged so that the cylinder may begin combusting air and fuel after skipping combustion in the engine cylinder for one cycle of the engine cylinder.

The method of FIG. 5 provides for an engine operating method, comprising: operating an engine cylinder with an igniter that includes a pre-chamber in skip-fire mode in response to cold starting an engine. In a first example, the engine operating method further comprises injecting fuel into the engine cylinder during an engine cycle in which the engine cylinder operates in skip-fire mode. In a second example that may include the first example, the engine operating method further comprises igniting the fuel in an exhaust system of an engine via a second igniter. In a third example that may include one or both of the first and second examples, the engine operating includes where the skip-fire mode includes not igniting an air-fuel mixture in the engine cylinder. In a fourth example that may include one or more of the first through third examples, the engine operating method further comprises not operating a second engine cylinder in skip-fire mode during an engine cycle in which the engine cylinder operates in skip-fire mode. In a fifth example that may include one or more of the first through fourth examples, the engine operating method further comprises operating the engine cylinder in skip-fire mode in response to a misfire in the engine cylinder. In a sixth example that may include one or more of the first through fifth examples, the engine operating method includes where the engine cylinder is operated in skip-fire mode during an engine cycle immediately following an engine cycle in which the engine cylinder misfired.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine system, comprising:

an internal combustion engine;

a plurality of cylinders, each of the plurality of cylinders including a first igniter having a pre-chamber; and a controller including executable instructions stored in non-transitory memory that cause the controller to operate the plurality of cylinders of the internal combustion engine in skip-fire mode in response to a cold start of the internal combustion engine, where the skip-fire mode includes, for each of the plurality of cylinders, alternating between not combusting fuel and combusting fuel every sequential engine cycle, and where the plurality of cylinders are all operated in the skip-fire mode at a same time for multiple engine cycles.

2. The engine system of claim 1, wherein, during the skip-fire mode, each cylinder is operated without two consecutive engine cycles of fuel combustion being carried out.

3. The engine system of claim 1, wherein half of the plurality of cylinders combust fuel each engine cycle during the skip-fire mode, and wherein half of the plurality of cylinders do not combust fuel each engine cycle during the skip-fire mode.

4. The engine system of claim 1, where the plurality of cylinders includes a first set of cylinders and a second set of cylinders, and where operating all of the plurality of cylinders in the skip-fire mode for multiple engine cycles includes operating both the first set of cylinders and the second set of cylinders in the skip-fire mode, where the first set of cylinders and the second set of cylinders are operated in skip-fire mode such that the first set of cylinders fires during a different engine cycle than an engine cycle when the second set of cylinders fires.

5. The engine system of claim 1, further comprising additional executable instructions that cause the controller to change from skip-fire mode to fire each cycle mode in response to a catalyst temperature.

6. The engine system of claim 1, further comprising additional executable instructions that cause the controller to enter skip-fire mode a predetermined actual total number of engine cycles after exiting engine cranking, wherein the engine cranking comprises cranking the internal combustion engine during the cold start as part of a process to initiate combustion.

7. An engine operating method, comprising:

operating a plurality of engine cylinders each with an igniter that includes a pre-chamber in skip-fire mode in response to cold starting an engine, where the plurality of engine cylinders are simultaneously operated in the skip-fire mode, and where the skip-fire mode includes, for each of the plurality of engine cylinders, alternating between not combusting fuel and combusting fuel every sequential engine cycle, and where the plurality of engine cylinders are all operated in the skip-fire mode at a same time for multiple engine cycles.

8. The engine operating method of claim 7, wherein none of the plurality of engine cylinders are operated with two consecutive engine cycles of fuel combustion during the skip-fire mode.

9. The engine operating method of claim 7, further comprising, for each of the plurality of engine cylinders, injecting fuel during an engine cycle in which the plurality of engine cylinders operates in the skip-fire mode.

10. The engine operating method of claim 9, further comprising igniting the fuel in an exhaust system of the engine via a second igniter.

11. The engine operating method of claim 7, where skip-fire mode includes not igniting an air-fuel mixture in the plurality of engine cylinders.

12. An engine system, comprising:

an internal combustion engine;

a plurality of cylinders of the internal combustion engine, the plurality of cylinders including a cylinder with a first igniter and having a pre-chamber; and a controller including executable instructions stored in non-transitory memory that cause the controller to:

detect one or more misfires in the cylinder of the plurality of cylinders, and operate only the cylinder in which the one or more misfires were detected of the plurality of cylinders of the internal combustion engine in skip-fire mode in response to detecting the one or more misfires in the cylinder; and detect a cold start of the internal combustion engine, and responsive to the cold start, operate the plurality of cylinders of the internal combustion engine in skip-fire mode, where the skip-fire mode includes, for each of the plurality of cylinders, alternating between not combusting fuel and combusting fuel every sequential engine cycle, and where the plurality of cylinders are all operated in the skip-fire mode at a same time for multiple engine cycles.

13. The engine system of claim 12, wherein half of the plurality of cylinders combust fuel during the skip-fire mode each engine cycle, and wherein half of the plurality of cylinders do not combust fuel each engine cycle during the skip-fire mode, and wherein none of the plurality of cylinders are operated with two consecutive engine cycles of fuel combustion during the skip-fire mode.

14. The engine system of claim 12, where the cylinder is operated in skip-fire mode for one or more engine cycles following the one or more misfires.

15. The engine system of claim 12, further comprising additional executable instructions that cause the controller to not inject fuel to the cylinder while operating the cylinder in the skip-fire mode.

16. The engine system of claim 12, further comprising additional executable instructions that cause the controller to operate a second cylinder of the internal combustion engine in the skip-fire mode in response to one or more misfires in the second cylinder.

17. The engine system of claim 12, further comprising additional executable instructions that cause the controller to recognize the one or more misfires.

18. The engine system of claim 12, where, for multiple engine cycles, a remainder of the plurality of cylinders of the internal combustion engine are operated in a fire each cycle mode while only the cylinder is operated in the skip-fire mode.

* * * * *